2,858,335
PURIFICATION OF DICARBOXYLIC ACID

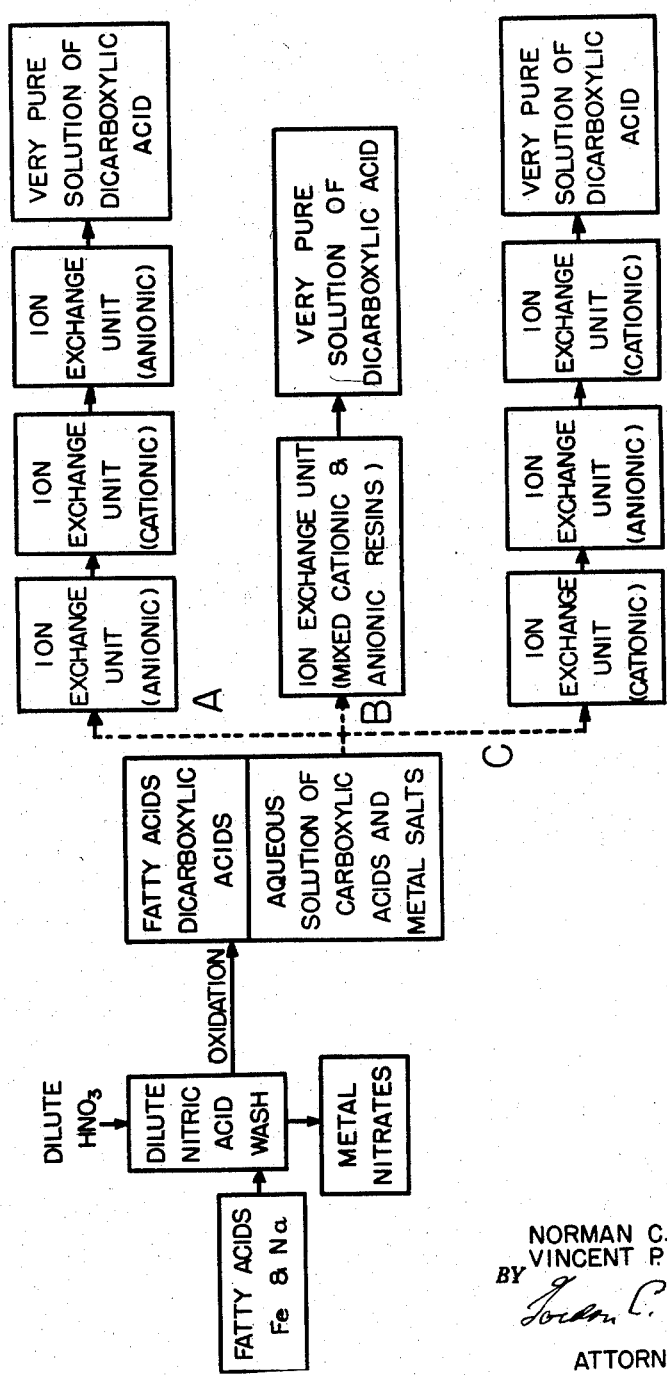

Norman C. Hill, Akron, Ohio, and Vincent P. Kuceski, Park Forest, Ill., assignors to The C. P. Hall Company, Akron, Ohio, a corporation of Ohio Application August 18, 1954, Serial No. 450,822

7 Claims. (Cl. 260—537)

This invention relates to the purification of dicarboxylic acids produced by oxidation of saturated and unsaturated, cyclic and acyclic, aliphatic hydrocarbons and oxygenated derivatives thereof, and more particularly fatty acids. Nitric acid is preferably used as the oxidizing agent; nitrous acid or an oxide of nitrogen higher than $N_2O$ may be used. Such an oxidizing agent may be used alone or in conjunction with air. Other oxidizing operations such as ozonization may be used before or after such oxidation.

By "fatty acid" we refer to unsaturated and saturated carboxylic acids, whether found in nature or produced synthetically as by the Oxo process or the Fischer-Tropsch process, etc. Alcohols, aldehydes, ketones, ethers and esters produced by such synthetic processes may be oxidized and otherwise treated as contemplated herein either alone or together with monocarboxylic acids produced in admixture therewith. The treatment is limited to the oxidation of starting materials having at least 4 adjacent carbon atoms in saturated chain.

The process is adapted for use in the treatment of the longer-chain fatty acids such as the naturally occurring acids of 12, 14, 16 and 18 carbon atoms. These fatty acids may be derived from animal sources or vegetable sources, or may be synthesized. For instance, the acid may be red oil, stearic acid, or other fatty acid of the animal fatty acid group; cocoanut fatty acids, cottonseed fatty acids, and other seed oil fatty acids; fatty acids derived from the foots of various sources, fish oil fatty acids, hydrogenated fatty acids, tall oil fatty acids, and fatty acids from synthetic sources such as those derived from petroleum, etc.

If nitric acid is used as the oxidizing agent, an acid of a concentration of 8 or 10 percent or higher will be employed, and generally acid of some 30 to 59 percent concentration will be used. Concentrations up to 80 percent, and even substantially 100 percent may be used satisfactorily. Where higher concentrations of nitric acid are employed, it will be found best to use lower temperatures. Such acid may be used at room temperature or elevated temperatures and under atmospheric or superatmospheric pressures. It may be used in conjunction with air, and with oxides of nitrogen higher than $N_2O$. Thus the nitric acid may be used alone or in combination with other oxidizing agents and with or without a catalyst. The nitric acid oxidation may be preceded by ozonization or it may be followed by ozonization, or may be preceded or followed by other oxidizing processes.

When the oxidizing agent is nitric acid, nitrous acid or an oxide of nitrogen higher than $N_2O$, the aqueous reaction product which includes dicarboxylic acids and monocarboxylic acids produced by the oxidation, also includes nitric or nitrous acid. Metal contaminants present in the starting material will be converted to metal salts, principally nitrates. These metal contaminants are derived from metal present in the crude fatty acid or from the corrosion of the equipment, such as the oxidation vessel. These contaminants generally include a relatively high percentage of iron, and, depending upon the source of the starting material, a considerable percentage of sodium. Salts of other metals such as chromium, nickel, cobalt, lead, calcium, tungsten, manganese, tin, copper, zinc, aluminum, magnesium, silicon and silver may be present in larger or smaller amounts, depending upon the history of the starting material, the metal contaminants and the nitric acid used in the oxidation, and the equipment in which the oxidation is carried out.

In the aqueous phase of the reaction mixture resulting from the oxidation there is nitric acid which must be separated, and there are also metal salts which must be separated in order to obtain pure carboxylic acids. The quantity of impurities present is such that it would take a large ion exchange unit or units to remove all of them. According to this invention some of the metal contaminants are preferably removed from such contaminated starting material by a dilute nitric acid wash before the oxidation operation. This nitric acid may contain nitrogen oxides and, in fact, may be largely nitrous acid. Whether or not such a wash is included, some of the metal salts present in the aqueous phase of the reaction mixture and some of the nitric or nitrous acid are preferably first removed by other operations, and only the remaining metal salts and nitric acid are then treated in one or more ion exchange units for purification. The aqueous material for such treatment may be mother liquor from which some of the carboxylic acids have been crystallized or separated, or it may be an aqueous solution obtained by dissolving in water dicarboxylic acids which have been crystallized from an aqueous solution thereof and then dissolved in a non-polar or slightly polar organic solvent such as trichloropropane or dichlorobenzene. The use of such solvents is disclosed in Murphy application Serial No. 169,065, now abandoned, and Pooler application Serial No. 169,542, now Patent No. 2,716,133.

The nitric acid remaining in the aqueous medium and the metal salts present therein are removed by an ion exchange process.

The accompanying drawing illustrates three possible ion-exchange operations. These are alternative operations and identified by the letters A, B and C. If the operation follows the path identified by the letter A, the acid will first be removed in an anionic unit, the metal salts will be converted to acid in a cationic unit, and the aqueous solution will then be again passed through the anionic unit or will be passed through a separate anionic unit to remove the acid generated in the cationic unit. Alternatively, the acid and salts may both be removed in a unit containing mixed cationic and anionic resin as illustrated by path B. Path C shows a third alternative arrangement in which the most of the metal ions are first removed in a cationic unit; then the acid generated in this unit together with acid originally present in the aqueous medium is removed from the aqueous medium in an anionic unit. Then in the third unit last traces of the metal ion are removed which could not be removed originally because of the mineral acid present. Naturally occurring or synthetic ion-exchange materials may be used in the units.

After treatment in the ion-exchange unit or units the aqueous solution may be utilized in any desired manner. For instance, dicarboxylic acids may be crystallized therefrom, or the aqueous solution may be evaporated or utilized as it is, for any subsequent desired operation.

If there is any considerable amount of sodium or other monovalent ion present, this will not be held by the resin as firmly as a polyvalent metal ion such as ferrous or ferric iron, and such polyvalent metal ion will be held by the cationic resin, and if present in any substantial quantity, will prevent the removal of any large amount of sodium or other monovalent ion, unless an extremely large unit is provided. In order to effect the desired purification in a small unit the sodium or other monovalent ion is preferably largely removed before the treatment in the ion exchange process. Such removal of the monovalent metal is preferably accomplished by treating the fatty acid or other starting material with an aqueous solution of dilute nitric acid before oxidation. The pretreatment is disclosed in our copending application Serial No. 450,823, filed August 18, 1954.

As an example, a mother liquor containing 50 percent dicarboxylic acid by weight obtained by nitric acid oxidation of red oil and concentration of the resulting aqueous reaction mixture, and separation of less soluble carboxylic acids therefrom by crystallization, analyzed 9900 parts per million ash. The 9900 parts per million of ash contained 24.4 percent of iron and 1.35 percent of chromium. The remainder consisted largely of sodium and smaller amounts of nickel, cobalt, lead, calcium, tungsten, manganese, tin, copper, zinc, aluminum, magnesium, silicon and silver. By passage of said mother liquor through the ion exchange resin by path C of the drawing, the ash content was reduced from 9900 parts per million to 426 parts per million, thus indicating a reduction of approximately 95.7 percent in the metal ion content originally present in the solution. Since the red oil was not pre-treated with dilute nitric acid before oxidation, the principal metal present in this latter ash consisted largely of sodium. The iron content amounted to less than one part per million. Only trace quantities (less than one part per million) of the other metals were present. By pre-treating with a dilute nitric acid wash as described as aforesaid and illustrated in the accompanying drawing, the sodium compounds present in the red oil were largely removed. There is ordinarily little possibility of sodium contamination during the oxidation operations, and thus the aqueous carboxylic acids during purification are substantially free from sodium. Thus, in the ion exchange treatment of such materials from which the sodium has been largely removed by dilute nitric acid pre-treatment, aqueous carboxylic acid solutions are obtained from the ion exchange operation which are substantially free of sodium as well as polyvalent metals, and such purification is effected in relatively small ion exchange units.

Following paths A and B of the drawing, aqueous solutions equally free from contamination by metal salts are obtained. By pre-treatment of the starting material with a dilute nitric acid wash before oxidation, sodium as well as polyvalent metal compounds may be largely removed, and the advantages previously pointed out in connection with path C also pertain to paths A and B.

The ion exchange treatment may be applied to other aqueous solutions derived from the oxidation process. For example, the crystallized acids consisting largely of succinic, adipic, suberic, azelaic and sebacic acids, or any portion thereof (the exact percentage depending upon the composition of the fatty acids and the nature of the oxidation reaction) may be purified by passing a water solution of said acids through one or more of the ion exchange units. In the ion exchange units mineral acid as well as metal ions will be reduced to mere traces measurable in parts per million. If the starting material is pretreated with a dilute nitric acid wash, the number of regenerations of any ion exchange unit or the number of units employed for removal of acid or metal ion as here described is greatly reduced.

What we claim is:

1. In the process of producing dicarboxylic acids from a starting material which is immiscible with dilute nitric acid and which includes a substantial amount of fatty acid which contains at least 4 adjacent carbon atoms in a saturated chain and which starting material contains a metal contaminant, the steps which comprise washing the starting material with dilute nitric acid and producing metal nitrate from the contaminant and separating the metal nitrate from the starting material by solution thereof in the dilute nitric acid, then without separating unused nitric acid oxidizing the resulting material from which contaminant has thus been removed by a process which involves oxidation with nitric acid, dissolving in water at least some of the dicarboxylic acid thus produced together with some metal contaminant, and thereafter treating the aqueous solution of the dicarboxylic acid which contains metal contaminant with both anionic and cationic resins and thereby by ion exchange separating a substantial amount of the metal contaminant from the dicarboxylic acid.

2. In the process of producing dicarboxylic acids from a starting material which is immiscible with dilute nitric acid and which includes a substantial amount of fatty acid which contains at least 4 adjacent carbon atoms in a saturated chain and which starting material contains a monovalent metal contaminant the steps which comprise washing the starting material with dilute nitric acid and producing metal nitrate from the contaminant and separating the metal nitrate from the starting material by solution thereof in the dilute nitric acid, then without separating unused nitric acid oxidizing the resulting material from which monovalent metal contaminant has been thus removed by a process which involves oxidation with nitric acid, dissolving in water at least some of the dicarboxylic acid thus produced together with some monovalent metal contaminant and thereafter treating the aqueous solution of the dicarboxylic acid and said monovalent metal contaminant substantially simultaneously with anionic and cationic resins in a mixture thereof and thereby by ion exchange separating a substantial amount of the monovalent metal contaminant.

3. In the process of producing dicarboxylic acids from a starting material which is immiscible with dilute nitric acid and which includes a substantial amount of fatty acid which contains at least 4 adjacent carbon atoms in a saturated chain and which starting material contains a monovalent metal contaminant the steps which comprise washing the starting material with dilute nitric acid and producing metal nitrate from the contaminant and separating the metal nitrate from the starting material by solution thereof in the dilute nitric acid, then without separating unused nitric acid oxidizing the resulting material from which monovalent metal contaminant has been thus removed by a process which involves oxidation with nitric acid, dissolving in water at least some of the dicarboxylic acid thus produced together with some monovalent metal contaminant and thereafter treating the aqueous solution of the dicarboxylic acid and said monovalent metal contaminant successively with cationic resin, anionic resin, and then cationic resin and thereby by ion exchange separating a substantial amount of the monovalent metal contaminant and thereafter crystallizing dicarboxylic acid from the resulting aqueous solution.

4. In the process of producing dicarboxylic acids from a starting material which is immiscible with dilute nitric acid and which includes a substantial amount of fatty acid which contains at least 4 adjacent carbon atoms in a saturated chain and which starting material contains a monovalent metal contaminant the steps which comprise washing the starting material with dilute nitric acid and producing metal nitrate from the contaminant and separating the metal nitrate from the starting material by solution thereof in the dilute nitric acid, then without separating unused nitric acid oxidizing the resulting material from which monovalent metal contaminant has been thus removed by a process which involves oxidation with nitric acid, dissolving in water at least some of the dicarboxylic acid thus produced together with some monovalent metal contaminant and thereafter treating the aqueous solution of the dicarboxylic acid and said monovalent metal contaminant successively with anionic, cationic, and then anionic resins and thereby by ion exchange separating a substantial amount of the monovalent metal contaminant and thereafter crystallizing dicarboxylic acid from the resulting aqueous solution.

5. In the process of producing dicarboxylic acids from a starting material which is immiscible with dilute nitric acid and which includes a substantial amount of fatty acid which contains at least 4 adjacent carbon atoms in a saturated chain and which starting material contains iron contaminant, the steps which comprise washing the starting material with dilute nitric acid and producing iron nitrate from the contaminant and separating the iron nitrate from the starting material by solution thereof in the dilute nitric acid, then without separating unused nitric acid oxidizing the resulting material from which iron contaminant has been thus removed, by a process which involves oxidation with nitric acid, dissolving in water at least some of the dicarboxylic acid thus produced together with some iron contaminant and thereafter treating the aqueous solution of the dicarboxylic acid and iron contaminant substantially simultaneously with anionic and cationic resins and thereby by ion exchange separating a substantial amount of the iron contaminant.

6. In the process of producing dicarboxylic acids from a starting material which is immiscible with dilute nitric acid and which includes a substantial amount of fatty acid which contains at least 4 adjacent carbon atoms in a saturated chain and which starting material contains iron contaminant, the steps which comprise washing the starting material with dilute nitric acid and producing iron nitrate from the contaminant and separating the iron nitrate from the starting material by solution thereof in the dilute nitric acid, then without separating unused nitric acid oxidizing the resulting material from which iron contaminant has been thus removed, by a process which involves oxidation with nitric acid, dissolving in water at least some of the dicarboxylic acid thus produced together with some iron contaminant and thereafter treating the aqueous solution of the dicarboxylic acid and iron contaminant successively with cationic, anionic, and then cationic resins and thereby by ion exchange separating a substantial amount of the iron contaminant and thereafter crystallizing dicarboxylic acid from the resulting aqueous solution.

7. In the process of producing dicarboxylic acids from a starting material which is immiscible with dilute nitric acid and which includes a substantial amount of fatty acid which contains at least 4 adjacent carbon atoms in a saturated chain and which starting material contains iron contaminant, the steps which comprise washing the starting material with dilute nitric acid and producing iron nitrate from the contaminant and separating the iron nitrate from the starting material by solution thereof in the dilute nitric acid, then without separating unused nitric acid oxidizing the resulting material from which iron contaminant has been thus removed, by a process which involves oxidation with nitric acid, dissolving in water at least some of the dicarboxylic acid thus produced together with some iron contaminant and thereafter treating the aqueous solution of the dicarboxylic acid and iron contaminant successively with anionic, cationic, and then with anionic resins and thereby by ion exchange separating a substantial amount of the iron contaminant and thereafter crystallizing dicarboxylic acid from the resulting aqueous solution.

References Cited in the file of this patent

UNITED STATES PATENTS

| | | |
|---|---|---|
| 2,253,061 | Manley | Aug. 19, 1941 |
| 2,413,009 | Taussky | Dec. 24, 1946 |
| 2,470,500 | Lawrence | May 17, 1949 |
| 2,586,883 | Stroh | Feb. 26, 1952 |
| 2,610,974 | Nelson | Sept. 16, 1952 |
| 2,716,133 | Pooler | Aug. 23, 1955 |